United States Patent
Deutscher

(12) 
(10) Patent No.: US 6,373,061 B1
(45) Date of Patent: Apr. 16, 2002

(54) RADIATION DETECTOR FOR A COMPUTED TOMOGRAPHY APPARATUS AND METHOD FOR MANUFACTURING SAME

(75) Inventor: Thomas Deutscher, Lauf-Simonshofen (DE)

(73) Assignee: Seimens Aktiengesellschaft, Munich (DE)

( * ) Notice: Subject to any disclaimer, the term of this patent is extended or adjusted under 35 U.S.C. 154(b) by 0 days.

(21) Appl. No.: 09/393,972

(22) Filed: Sep. 10, 1999

(30) Foreign Application Priority Data

Sep. 18, 1998 (DE) .......................... 198 42 947

(51) Int. Cl.⁷ ................................ G01T 1/20
(52) U.S. Cl. ...................... 250/367; 250/368
(58) Field of Search ................ 250/367, 368, 250/370.09, 370.11

(56) References Cited

U.S. PATENT DOCUMENTS

| | | | |
|---|---|---|---|
| 4,870,279 A | | 9/1989 | Cueman et al. |
| 4,914,301 A | * | 4/1990 | Akai ...................... 250/370.01 |
| 4,982,096 A | * | 1/1991 | Fujii et al. .................... 250/367 |
| 5,059,800 A | | 10/1991 | Cueman et al. |
| 5,386,122 A | * | 1/1995 | Yoshida et al. ............. 250/368 |
| 5,506,409 A | * | 4/1996 | Yoshida et al. ............. 250/368 |
| 5,801,385 A | * | 9/1998 | Endo et al. ............ 250/370.11 |
| 5,956,382 A | * | 9/1999 | Wiener-Avnear et al. .. 378/98.8 |
| 6,118,851 A | * | 9/2000 | Endo et al. ................. 378/98.8 |

FOREIGN PATENT DOCUMENTS

| | | |
|---|---|---|
| DE | 197 10 958 | 8/1998 |
| DE | 197 14 689 | 10/1998 |

* cited by examiner

Primary Examiner—Constantine Hannaher
Assistant Examiner—Otilia Gabor
(74) Attorney, Agent, or Firm—Schiff Hardin & Waite

(57) ABSTRACT

In a method for manufacturing a radiation detector and a radiation detector of a computed tomography apparatus manufactured in accordance therewith, a grid-like structure is introduced into a luminophore layer. It is thus possible to simultaneously scan a number of slices during a computed tomography examination of a subject.

11 Claims, 1 Drawing Sheet

US 6,373,061 B1

RADIATION DETECTOR FOR A COMPUTED TOMOGRAPHY APPARATUS AND METHOD FOR MANUFACTURING SAME

BACKGROUND OF THE INVENTION

1. Field of the Invention

The present Invention is directed to a method for manufacturing a radiation detector for a computed tomography apparatus, as well as to a radiation detector manufactured in accordance with the method.

2. Description of the Prior Art

German OS 39 18 843, corresponding to U.S. Pat. No. 4,870,279, discloses a radiation detector for a computed tomography apparatus as well as a method for manufacturing the radiation detector wherein the radiation detector has a linear row of elongated scintillator rods of dense polycrystalline ceramic material with a rectangular cross section, with one end face in communication via a glued fastening with at least one photodetector of a photodetector row.

For manufacturing such a radiation detector, a wafer of the scintillator material is mounted on a temporary base plate and is cut into a series. of barn, with a dicing saw. After mounting lapping shims on the base plate, a reflective coating is applied that completely fills the spaces between the individual bars. The shims and the excess coating are lapped off and the back surfaces of the scintillator bars are polished. A carrier plate is glued to the back surface of the row of bars, with the reflective coating used as the adhesive. Subsequently, the temporary base plate Is lapped off and the interconnected wafer surface and the front surfaces of the bars are polished. The row of bars with the carrier plate is cut to proper size and the base of the linear row is mounted on an integrated circuit photodetector row. Finally, all uncovered surfaces of the scintillator bars are covered with the reflective coating.

Only one slice can be scanned during a computed tomography examination of a subject with such a radiation detector, however, to be able to simultaneously examine a number of slices of the subject in a computed tomography examination of the subject would be advantageous, U.S. Pat. No. 5,059,800 discloses a planar x-ray detector that has a grid structure of scintillator material, with a photodetector coupled to the grid elements.

SUMMARY OF THE INVENTION

An object of the present invention is to provide a radiation detector of the type initially described and a method for the manufacture thereof wherein the manufacturing outlay is reduced.

According to the Invention, a luminophore layer that is preferably composed of ultraviolet-sensitive material is applied onto an adhesive film in a method step. By subsequently introducing the grid-like structure into the luminophore layer up to the adhesive film with an abrasive cutting process or with lasers, it is thus assured that the grid-like structure of the luminophore layer is advantageously retained after the introduction of the structure. A reordering of the grid elements is thus not required, so that, in particular, the manufacturing outlay is reduced in terms of time. After this, a further adhesive film is applied on that side of the luminophore layer lying opposite the adhesive film, and the ultraviolet-sensitive adhesive film is removed by the application of ultraviolet light. A material that Is substantially opaque to light and that preferably reflects the light emerging from the grid elements back is introduced in the space between the matrix elements of the matrix-shaped structure. In the following method step, at least one surface of the luminophore layer is surface-treated to provide good light transmission to a following photodetector. A gridded luminophore layer is thus obtained that can be inspected in view of its properties and potential faults before it is coupled to the photodetector in a further method step. It is thus likewise possible to test the photodetector for functionability before the luminophore layer is coupled to it. Only those luminophore layers and photodetectors that satisfy a predetermined quality criterion are consequently joined. The rejects, and thus the costs, are considerably reduced compared to a conventional method wherein the luminophore layer and the photodetectors are joined before they are tested.

DESCRIPTION OF THE PREFERRED EMBODIMENTS

Figure 1:
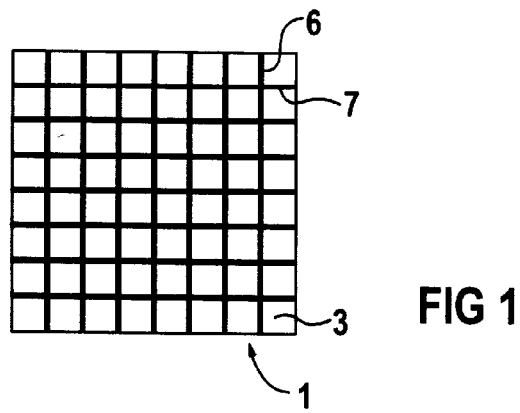
FIG. 1 shows a luminophore layer of the invention.
Figure 2:
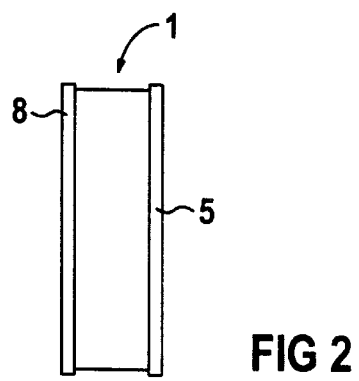
FIG. 2 shows the luminophore layer of FIG. 1 in a side view.
Figure 3:
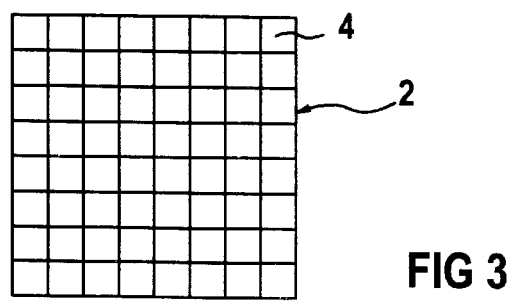
FIG. 3 is a schematic illustration of a photodetector.
Figure 4:
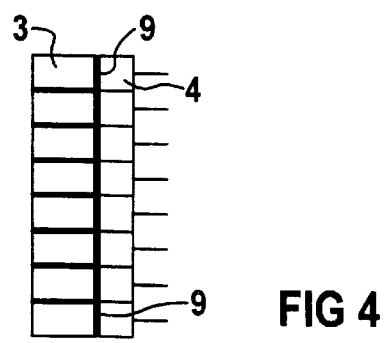
FIG. 4 shows a luminophore layer according to FIGS. 1 and 2 in combination with a photodetector according to FIG. 3.

The components in the figures are a luminophore layer 1, a photodetector 2, grid elements 3 of a luminophore layer and detector elements 4 of the photodetector 2.

The luminophore layer 1 formed by scintillator lamina composed of oxides of rare earths that are doped with activators of rare earths such as, for example, yttrium oxide or gadolinium oxide that is activated to luminesce with one or more of europium oxide, neodymium oxide, ytterbium bi-oxide and/or dysprosium oxide. The luminophore layer 1 is inventively attached to a first adhesive film 5 that, for example, is composed of ultraviolet-sensitive material before, in a further method step, a grid-like structure of rods or some other suitable structure is introduced into the luminophore layer 1 with an abrasive cutting process or with a laser beam. Preferably, first line-shaped recesses are cut or excised into the luminophore layer 1, with second line-shaped recesses being cut or excised approximately perpendicularly thereto. The recesses are conducted only to such a depth that they just reach the first adhesive film 5 but do not enter it. Insofar as the grid elements 3 have retained a predetermined orientation and positioning after the introduction of the recesses into the luminophore layer 1, a second adhesive film 8 is applied on the surface lying opposite the first adhesive film 5, and the first adhesive film 5 is removed, which can ensue by applying ultraviolet light given the employment of an ultraviolet-sensitive adhesive film 5. If one or more grid elements 3 have not retained the desired alignment and position after the introduction of the recesses, then the first adhesive film 5 is removed and the grid elements 3 are positioned with a positioning frame before the second adhesive film 8 is applied onto the surface lying opposite the first adhesive film 6. In the following procedure, the gridded luminophore layer 1 is arranged in a casting frame that Is of such a nature that the edge region of the lamina-shaped luminophore layer 1 has a slight spacing from the edge of a recess of the casting frame that accepts the luminophore layer 1. In the following method step, the space between the grid elements 3 and the space between the luminophore layer 1 and the edge of the casting frame is filled with a material that is substantially opaque to light (optically opaque). This material is selected such that it reflects any light which may emerge from the grid elements 3, so that no signal losses arise or so that no crosstalk ensues from one grid element 3 due to the transfer of light to a neighboring grid element 3. Epoxy resin filled with titanium dioxide, for example, has proven especially advantageous as a material suited for this purpose. In a further method step, an active surface through which the light can be transmitted optimally loss-Free is fashioned after the unmolding of the lamina-like luminophore layer 1. Thus the lamina-like luminophore layer 1 has all surfaces except for this active surface covered with the material that is substantially opaque to light, so that the light of the luminophore layer 1 can proceed toward the exterior only via this active surface.

A luminophore layer 1 for a radiation detector Is thus obtained that, by applying radiation, can be tested in view of undesired properties, such as inhomogeneities or irregularities, before it is brought into connection with the photodetector 2.

The photodetector 2 likewise can be tested in view of potential faults before it is brought into connection with the luminophore layer 1.

In the following method step that joins the luminophore layer 1 to the photodetector 2, an optimally thin and optically transparent adhesive surface 9 is provided between the luminophore layer 1, i.e. the active surface; and the surface of the photodetector 2, and the luminophore layer 1 is aligned such with reference to the photodetector 2 so that at least one detector element 4 is optimally centrally allocated to a grid element 3.

The signal of the detector elements 4 proceeding from the light of the luminophore layer 1 is read out in a known way and, for example, supplied to an image processing means of the computed tomography apparatus which is followed by a display means.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for manufacturing a radiation detector for a computed tomography apparatus comprising the steps of:
   applying a luminophore layer onto an adhesive film; and
   subsequently introducing a grid-like structure into the luminophore layer applied onto said adhesive film.

2. A method as claimed in claim 1 comprising the step of employing ultraviolet-sensitive material as said adhesive film.

3. A method as claimed in claim 1 wherein the step of introducing a grid-like structure into said luminophore layer comprises abrasively cutting said grid-like structure into said luminophore layer.

4. A method as claimed in claim 1 wherein the step of introducing a grid-like structure into said luminophore layer comprises laser-excising said grid-like structure into said luminophore layer.

5. A method as claimed in claim 1 wherein the step of introducing a grid-like structure into said luminophore layer comprises removing material from said luminophore layer in a grid-like pattern to a depth exposing, but not entering into, said adhesive film.

6. A method as claimed in claim 1 wherein said adhesive film is a first adhesive film applied on a first side of luminophore layer, and said method comprising the additional steps of applying a second adhesive film on a second side of said luminophore layer, opposite said first side, and subsequently removing said first adhesive film.

7. A method as claimed in claim 1 wherein said grid-like structure in said luminophore layer forms a plurality of grid elements in said luminophore layer with spaces therebetween, and comprising the additional step of filling said spaces with an optically opaque material.

8. A method as claimed in claim 7 wherein said grid elements of said luminophore emit light upon exposure to x-rays, and wherein said optically opaque material reflects said light.

9. A method as claimed in claim 1 comprising the additional steps of coupling a surface of said luminophore layer to a photodetector, and treating said surface of said luminophore layer for improving light transmission to said photodetector.

10. A method as claimed in claim 9 comprising the additional steps of positioning said luminophore layer relative to said photodetector before coupling said luminophore layer to said photodetector, and coupling said luminophore layer to said photodetector by bringing said luminophore layer and said photodetector into contact with each other with at least one detector element of said photodetector being allocated to a grid element of said luminophore layer.

11. A radiation detector for a computed tomography apparatus comprising:
    a luminophore layer having a side;
    an adhesive film applied to said side of said luminophore layer; and
    said luminophore layer having a grid-like structure introduced therein with said adhesive film applied thereon to a depth exposing said adhesive layer but not entering into said adhesive layer.

* * * * *